United States Patent Office 3,112,327
Patented Nov. 26, 1963

3,112,327
NOVEL DIPERCHLORYLDIPHENOQUINONES
AND PROCESS FOR THEIR MANUFACTURE
David M. Gardner, North Wales, and Robert E. Oesterling, Flourtown, Pa., assignors to Pennsalt Chemicals Corporation, Philadelphia, Pa., a corporation of Pennsylvania
No Drawing. Filed Jan. 4, 1961, Ser. No. 80,694
4 Claims. (Cl. 260—396)

This invention relates to novel chemical compounds and to a process for their manufacture. More particularly, this invention deals with diquinoids which we call diperchloryldiphenoquinones and which have the structure:

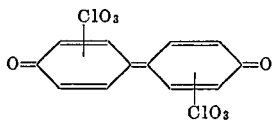

It is known to oxidize aniline with sodium dichromate and sulfuric acid to obtain benzoquinone in accord with the following reaction mechanism:

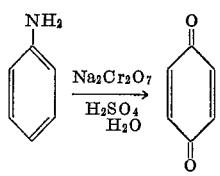

Surprisingly, however, we have found that a perchlorylaniline

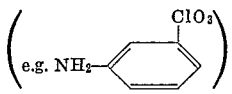

does not undergo an analogous reaction, but proceeds in a manner to yield a diperchloryldiphenoquinone characterized by the above structure. These novel compositions have several unusual properties which make them useful in several applications. Although the compounds melt sharply when heated slowly, they are thermally sensitive and explode upon rapid heating. The compounds are also shock sensitive and are thus useful explosives of value in blasting caps or as a primary explosive and may be compounded in accord with the methods used for high explosives (e.g., hexanitrodiphenylamine, 2,4,6 - trinitrophenylmethylnitramine, etc.) as described on pages 1 to 91 of vol. 6 of the Kirk-Othmer "Encyclopedia of Chemical Technology."

The compounds also have fungicidal and bactericidal properties due to their quinoid structure. Surprising also is their stability to reduction, no dihydroxy biphenyl derivative being obtained upon treatment with sulfurous acid which readily converts unsubstituted diphenoquinone

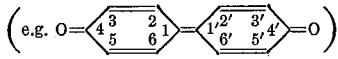

to 4,4-dihydroxy biphenyl.

It will be understood from the above structures that the particular isomeric diperchloryldiphenoquinone will depend upon the starting perchlorylaniline. That is 3-perchlorylaniline will yield 2,6'-diperchloryldiphenoquinone

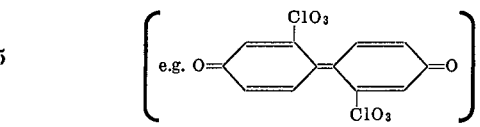

whereas 2-perchlorylaniline will yield 3,5'-diperchloryldiphenoquinone. The 2,2' structure is unlikely due to hindrance of the large $ClO_3$ groups which prohibit the coplanarity of the two rings which is required for formation of the diphenoquinone system.

As indicated, the diperchloryldiphenoquinone is prepared by the oxidation of the perchlorylaniline with solutions of sodium dichromate and sulfuric acid. The process is carried out at temperature of between about $-10°$ C. and about 50° C., the upper temperature being limited by the degradation of organic compounds that occurs with solutions of chromic and sulfuric acids. The product is recovered from the reaction mass readily by filtering off the insoluble crude product and purifying it in accord with the common techniques of organic synthesis, e.g. crystallization from solution.

The following examples will serve to further describe the invention:

Example 1

(All parts are by weight.)

A solution of 1.1 parts of 3-perchlorylaniline hydrochloride (prepared by the method described by Inman, Oesterling and Tyczkowski in J.A.C.S. 80 5286, 1958) in 40 parts of dilute sulfuric acid was cooled to 0° C. A solution of 2.5 parts of sodium dichromate in 15 parts of water was then dropped into the 3-perchlorylaniline hydrochloride solution with efficient stirring to mix the reaction products. Stirring was continued for 5 hours while holding the temperature at 0° to 10° C. and the reaction mass was then filtered to obtain 0.7 parts of a brown solid. This solid product was dissolved in 16 parts of chloroform with gentle warming (50° to 60° C.) to obtain a bright red-orange solution and a small amount of insoluble material which was filtered off. Light petroleum ether was added to the chloroform solution until precipitation of a product was obtained and the mass cooled to 0° C. The solid was filtered off to obtain 0.45 parts of crude product. The orange product was recrystallized from carbon tetrachloride to obtain 2,6'-diperchloryldiphenoquinone as orange granules, M.P. 180° to 182° C. Analysis indicated the following: Calc'd/found—percent C 41.28/41.41; percent H 1.73/1.84; percent Cl 20.31/20.49; mol. wt. 349/359.

The infrared spectrum confirmed the structure in indicating the presence of quinoid carbonyl (5.9 μ band) and the perchloryl group (8.4 μ band).

The diperchloryldiphenoquinone was recovered unchanged when its solution in aqueous ethanol was treated with sulfur dioxide.

Example 2

A 50 mg. sample of pure crystalline 2,6'-diperchloryldiphenoquinone was placed in a brass cup on a Drop-Weight Impact Testing Apparatus and subjected to 20 kilogram centimeters impact. The sample detonated sharply, emitting a bright flame and shattering the brass cup.

We claim:
1. A diperchloryldiphenoquinone of the formula

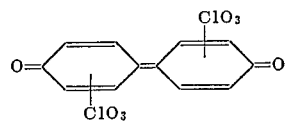

wherein the quinoid rings are coplaner.

2. 2,6'-diperchloryldiphenoquinone.
3. A process for preparing diperchloryldiphenoquinones which comprises oxidizing a perchlorylaniline at a temperature between about $-10°$ and about $50°$ C. with a mixture of sodium dichromate and sulfuric acid.
4. 3,5'-diperchloryldiphenoquinone.

No references cited.